Figure 1:
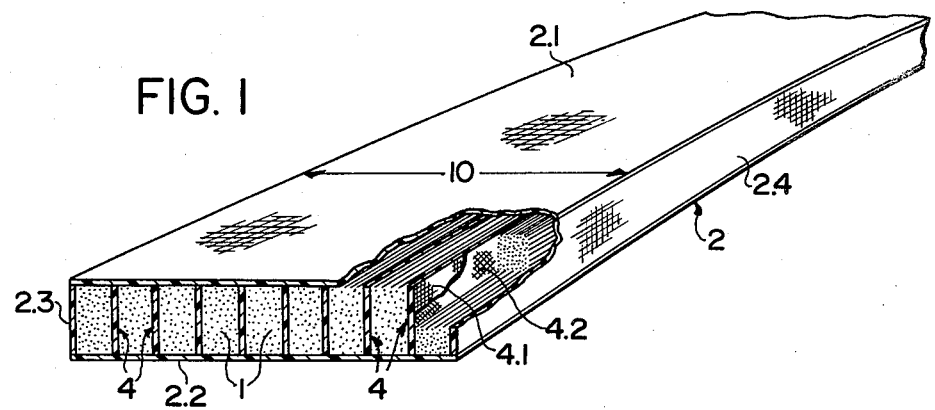

United States Patent [19]

Drachenberg et al.

[11] Patent Number: 4,457,500

[45] Date of Patent: Jul. 3, 1984

[54] BENDING SPRING MADE OF FIBER COMPOUND MATERIAL

[75] Inventors: Franz Drachenberg, Baldham; Walter Oefner, Mitterdarching, both of Fed. Rep. of Germany

[73] Assignee: Messerschmitt-Boelkow-Blohm Gesellschaft mit beschraenkter Haftung, Munich, Fed. Rep. of Germany

[21] Appl. No.: 372,562

[22] Filed: Apr. 28, 1982

[30] Foreign Application Priority Data

May 19, 1981 [DE] Fed. Rep. of Germany ....... 3119856

[51] Int. Cl.$^3$ .......................... F16F 1/36; F16F 1/18; B62B 5/12; B29H 7/04
[52] U.S. Cl. .................................. 267/148; 267/158; 156/179; 156/292; 428/113; 428/114
[58] Field of Search ............. 267/148, 149, 158, 36 R, 267/40, 47, 140.3, 141.1; 156/179, 292; 428/113, 114, 74, 221, 408, 294, 295, 902; 272/66; 124/23 R, 24 R; 273/DIG. 7

[56] References Cited

U.S. PATENT DOCUMENTS 3,142,598  7/1964  Rosen ................................. 156/162
3,434,465  3/1969  Stewart .............................. 124/23 R
3,850,156  11/1974  Eicholtz ........................ 273/DIG. 7
4,278,726  7/1981  Wieme ................................. 428/902

FOREIGN PATENT DOCUMENTS 7610592  3/1978  Netherlands ........................ 428/221

Primary Examiner—Bruce H. Stoner, Jr.
Assistant Examiner—Robert Oberleitner
Attorney, Agent, or Firm—W. G. Fasse; D. H. Kane, Jr.

[57] ABSTRACT

A bending spring or similar component made of fiber compound material is so constructed that the stress on the fiber reinforcing strands is optimized while the stress on the matrix of resinous impregnating material is reduced. For this purpose fiber inserts divide the matrix of suitable binder material which holds unidirectionally extending reinforcing fibers embedded in the matrix. The fiber inserts have a main fiber orientation extending about radially to the longitudinal bending axis of the spring. The fiber inserts may comprise layers of fiber webbings, for example double layers, whereby the fiber orientation in one webbing may differ from the fiber orientation in the other webbing.

10 Claims, 2 Drawing Figures

U.S. Patent Jul. 3, 1984 4,457,500

BENDING SPRING MADE OF FIBER COMPOUND MATERIAL

BACKGROUND OF THE INVENTION

The present invention relates to bending springs made of fiber compound materials in which fiber threads or strands are embedded in a resinous impregnating material which is bonded to the fibers which extend unidirectionally throughout the length of the bending spring. The invention relates especially to bent leaf springs.

Springs of this type are disclosed, for example, in U.S. Pat. No. 3,142,598. Such springs are frequently constructed in such a manner that the individual bent spring leaf is made of unidirectionally oriented glass fiber strands which extend over the entire length of the leaf spring and which are resin impregnated or embedded in a resinous bonding matrix. In other words, the cured or hardened resin functions as a matrix and as a bonding agent for the fibers. Thus, the resinous matrix must necessarily also take up the forces which result due to the bending load or stress applied to the fiber strands. Such loading may become critical where the bending load results in a bending of the spring in a direction contrary to the original bend of the spring. Such critical loading is due to the fact that the resinous matrix must secure the fiber strands against fanning out or a separation of the strands from the resinous matrix under the then effective transverse stress. Such transverse stress results from the radial components of the forces extending normally due to the torque load applied to the spring. The bonding action of the resinous matrix, or rather, between the resinous matrix and the fiber strands against these transverse stresses, must be satisfied by the resinous matrix, the more so the larger the thickness of the spring and the larger the original bend of the spring is. Therefore, high strength requirements must be satisfied by the resinous matrix. Heretofore, prior art structures of this type have not always satisfied these requirements.

OBJECTS OF THE INVENTION

In view of the above it is the aim of the invention to achieve the following objects singly or in combination:

to construct a bending spring especially of the leaf spring type in such a manner that the strength requirements of the resinous bonding mass are reduced;

to increase the bonding surface area between the resinous matrix material and the reinforcing fiber material; and to effectively relieve the resinous matrix material substantially of all transverse stress components resulting from a bending of the bending spring.

SUMMARY OF THE INVENTION

According to the invention there is provided a bending spring having a given width made of fiber compound materials, including unidirectionally oriented reinforcing fibers embedded in a fiber bonding mass, such as a resinous matrix material, comprising fiber layer insert means located in the bonding mass between the reinforcing fibers. The fiber layer insert means are spaced from one another along the given width of the bending spring and having a fiber orientation extending mainly radially relative to a bending axis of the bending spring.

The fiber layer insert means are primarily acting as effective reinforcements in the direction of spring bending, thereby effectively strengthening the resinous matrix and contributing to relieving the resinous matrix of any transverse stress load component resulting from a bending of the bending spring. In order to take up shearing stresses or forces resulting from a bending of the spring, the individual fiber layer insert means according to the invention comprise groups of fibers arranged in a crossover relationship relative to each other because the shearing stresses or transverse stresses or loads are effective perpendicularly to the radially effective transverse stress or compression forces.

BRIEF FIGURE DESCRIPTION

Figure 2:
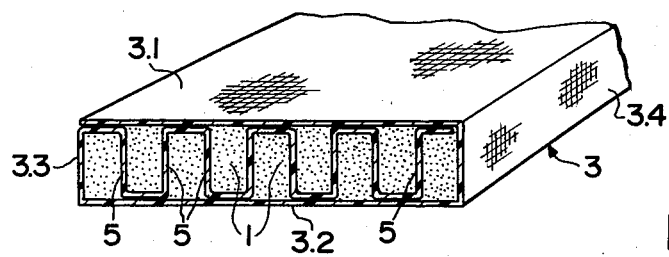

In order that the invention may be clearly understood, it will now be described, by way of example, with reference to the accompanying drawings, wherein:

FIG. 1 is a perspective view of a portion of a bending leaf spring according to the invention made of fiber reinforced synthetic material partially broken away; and FIG. 2 shows one end view of a modified embodiment according to the invention also as a perspective illustration.

DETAILED DESCRIPTION OF PREFERRED EXAMPLE EMBODIMENTS AND OF THE BEST MODE OF THE INVENTION

The bending leaf springs according to FIGS. 1 and 2 comprise basically a bonding mass or matrix of a resinous or other suitable type in which there are embedded reinforcing fiber threads or strands 1. These strands may, for example, be glass fibers or other synthetic fibers extending in a unidirectional fiber orientation over the entire length of the leaf spring. The fiber strands 1 are encased in an envelope 2 as shown in FIG. 1 or in an envelope 3 as shown in FIG. 2. These envelopes 2, 3 are made of webbings or layers of fibers, preferably of the same kind as the fibers 1 embedded in the matrix.

The leaf spring has a wide side with a given width 10 as shown in FIG. 1. The envelope 2 comprises a top layer 2.1 and a bottom layer 2.2 extending for the given width 10 of the leaf spring. Additionally the envelope comprises side layers 2.3 and 2.4 covering the narrow sides of the spring 2 having a lateral depth which is smaller than the given width as shown in FIG. 1. Thus, the spring will bend responsive to a load extending perpendicularly to said wide side.

In order to protect the leaf spring structure against a fanning out or unsplicing of the fiber strands 1 when the leaf spring is subject to a bending load, the bonding matrix is reinforced according to the invention by fiber thin layer insert means 4 in which the fiber orientation extends radially to the bending axis of the leaf spring. The inserts 4 are thin relative to the sections formed by the inserts in the body of fibers 1 in the resin matrix as shown in the Figures. States differently, when the leaf spring is subject to a bending load extending perpendicularly to the wide side, the fiber orientation in the reinforcing layers 4 extends in the direction of the transverse stress loads resulting from such bending of the leaf spring under load conditions. Thus, the fiber layer or webbing 4.1 has two groups of fibers extending at right angles to each other. In other words, one group of fibers extends in parallel to the reinforcing fibers 1 and the other group of fibers extends perpendicularly thereto.

This type of orientation is referred to as a 0/90° fiber orientation. Thus, only the fibers in one group are satisfying the above mentioned purpose. Thus, the fibers extending in the longitudinal direction in the webbing 4.1 and thus in parallel to the unidirectional fiber strands 1, satisfy only a further bonding function during the manufacturing of the spring leaf.

In order to more fully relieve the synthetic material matrix in which the fibers 1 are embedded from the load resulting in transverse stresses inside the leaf spring due to torsion applied to the leaf spring, the invention provides a further layer 4.2 in the form of a webbing or layer of reinforcing fibers in which two groups of fibers extend at a ±45° fiber orientation. A ±30° fiber orientation would also still be satisfactory relative to the reinforcing fibers 1. The upper and lower ends of the fiber layer inserts 4 in FIG. 1 are preferably reaching all the way to the reinforcing fiber cover layers 2.1 and 2.2, whereby the ends of these inserts 4 or rather the end edges thereof are bonded to the cover layers 2.1 and 2.2. Such bonding may be accomplished by an adhesive connection, for example by the matrix material (resinous).

Contrary to the structure of FIG. 1, FIG. 2 shows an embodiment in which the fiber layer reinforcing means 5 form a meandering portion of a cohesive fiber layer or webbing, another portion of which forms the envelope 3 with the top cover layer 3.1 and the bottom cover layer 3.2 as well as the side cover layers 3.3 and 3.4. The horizontally extending sections of the meandering portion 5 may preferably also be adhesively bonded to the top layer 3.1 and to the bottom layer 3.2, whereby compartments are formed in which the bonding matrix with the fibers 1 embedded therein is separated into bundles of matrix fibers 1.

Thus, in FIG. 1 each bonding between the longitudinal edges of the inserts 4 and the cover layers 2.1 and 2.2 form an I-beam section so to speak, whereas in FIG. 2 the meandering horizontally extending sections bonded to the cover layer 3.1 and 3.2 form also a type of reinforced beam structure.

The structure of FIG. 2 will normally result in a more compact type of leaf spring as compared to the structure illustrated in FIG. 1. However, as in FIG. 1 the insert portions 5 and the envelope forming portion may comprise fiber layers or fiber webbings with groups of fibers having the above described orientation relative to the longitudinal axis. Thus, one layer or webbing may have a 0/90° fiber orientation, whereas another layer or webbing may have a ±45° fiber orientation. In FIG. 1 the fiber orientation in the cover layers 2.1 and 2.2 will normally only be of the 0/90° type. On the other hand, the side portions 2.3 and 2.4 in FIG. 1 may also comprise the same arrangement as the insert 4, namely a 0/90° fiber orientation layer or webbing and a ±45° orientation layer or webbing.

Although the invention has been described with reference to specific example embodiments, it will be appreciated, that it is intended to cover all modifications and equivalents within the scope of the appended claims.

What is claimed is:

1. In a bending spring having a wide side of given width and a narrow side defining a spring thickness smaller than said given width, said bending spring being made of fiber compound materials including unidirectionally oriented reinforcing fibers (1) embedded in a fiber bonding mass, said wide side defining a surface for a load application perpendicularly to said wide side of said bending spring, the improvement comprising thin fiber layer inserts (4, 5) for transverse stress relief, said thin inserts dividing said bonding mass and unidirectional reinforcing fibers (1) into sections wider than said thin fiber layer inserts, said thin fiber layer inserts extending substantially entirely through said bending spring from wide side to wide side and being spaced from one another along said given width of the bending spring, said thin fiber layer inserts (4, 5) having a fiber orientation extending mainly perpendicularly relative to said wide side of said bending spring and hence substantially in parallel to the direction of load application, and also substantially in parallel to the narrow side of the spring for relieving said bonding mass of transverse stress components resulting from bending said spring.

2. The bending spring of claim 1, wherein said fiber layer inserts additionally, comprise fibers extending in a crosswise fiber orientation of at least ±30° relative to said reinforcing fibers (1).

3. The bending spring of claim 1 or 2, wherein each of said fiber layer inserts comprises at least two fiber layers (4.1; 4.2), wherein the fiber layers comprise fibers which cross one another in groups, whereby certain fibers in one fiber layer extend in parallel to the longitudinal axis of the bending spring while other fibers in said one fiber layer extend at a right angle to said longitudinal axis, and whereby the fibers in the other fiber layer extend at a ±45° orientation relative to the longitudinal axis of the bending spring.

4. The bending spring of claim 1, further comprising first and second reinforcing fiber cover layers (2.1; 2.2) covering at least the surfaces having said given width, said fiber layer inserts (4) reaching through the bending spring from one cover layer to the other for forming compartments in which said reinforcing fibers are embedded in said fiber bonding mass.

5. The bending spring of claim 4, wherein said fiber layer inserts are connected to said cover layers.

6. The bending spring of claim 4 or 5, further comprising third and fourth lateral reinforcing fiber cover layers (2.3; 2.4) interconnected with said first and second reinforcing fiber cover layers.

7. The bending spring of claim 1, further comprising reinforcing fiber cover layers, said fiber layer inserts and said further reinforcing fiber cover layers forming a continuous webbing so that the fiber layer inserts form a meandering portion inside said bending spring.

8. The bending spring of claim 7, wherein said meandering portion comprises sections extending in parallel to said reinforcing fiber cover layers.

9. The bending spring of claim 8, wherein said sections of the meandering portions are intimately bonded to said reinforcing fiber cover layers.

10. The bending spring of claim 1, constructed and arranged as a bending leaf spring.

* * * * *